US010007803B2

United States Patent
Kaushik et al.

(10) Patent No.: US 10,007,803 B2
(45) Date of Patent: Jun. 26, 2018

(54) SEARCHING OVER ENCRYPTED KEYWORDS IN A DATABASE

(71) Applicant: Infosys Limited, Bangalore (IN)

(72) Inventors: Kulvaibhav Kaushik, Jaipur (IN); Vijayaraghavan Varadharajan, Salem (IN); Rajarathnam Nallusamy, Chitrappatty (IN)

(73) Assignee: Infosys Limited, Bangalore (IN)

( * ) Notice: Subject to any disclaimer, the term of this patent is extended or adjusted under 35 U.S.C. 154(b) by 0 days. days.

(21) Appl. No.: 14/058,106

(22) Filed: Oct. 18, 2013

(65) Prior Publication Data

US 2014/0122900 A1    May 1, 2014

(30) Foreign Application Priority Data

Oct. 26, 2012   (IN) ............................ 4463/CHE/2012

(51) Int. Cl.
| | |
|---|---|
| *G06F 21/62* | (2013.01) |
| *G06F 17/30* | (2006.01) |
| *H04L 9/30* | (2006.01) |
| *G06F 7/72* | (2006.01) |

(Continued)

(52) U.S. Cl.
CPC .......... *G06F 21/6227* (2013.01); *G06F 7/725* (2013.01); *G06F 7/726* (2013.01); *G06F 17/30109* (2013.01); *G06F 17/30424* (2013.01); *H04L 9/3013* (2013.01);

(Continued)

(58) Field of Classification Search
CPC ............. H04L 9/3013; G06F 17/30106; G06F 17/30109; G06F 7/72; G06F 7/724; G06F 7/725; G06F 7/726
See application file for complete search history.

(56) References Cited

U.S. PATENT DOCUMENTS

| | | | |
|---|---|---|---|
| 6,751,613 B1 | 6/2004 | Lee et al. | |
| 7,634,087 B2 * | 12/2009 | Boneh et al. | ................... 380/28 |
| 7,921,450 B1 | 4/2011 | Vainstein et al. | |

(Continued)

FOREIGN PATENT DOCUMENTS

EP           364180           4/1990

OTHER PUBLICATIONS

Boneh, D. et al. "Identity-Based Encryption from the Weil Pairing". SIAM Journal of Computing, vol. 32, No. 3, pp. 587-615, 2003.*

(Continued)

*Primary Examiner* — Zachary A. Davis
(74) *Attorney, Agent, or Firm* — Klarquist Sparkman, LLP

(57) ABSTRACT

The present invention relates to a computer-implemented method, system and computer readable medium for searching over encrypted keywords in a database. The method includes the steps of generating at least one keyword, generating a plurality of different encrypted keywords corresponding to the keyword, storing the at least one encrypted keyword in the database, generating a plurality of different trapdoors for the keyword, verifying the plurality of different trapdoors with the plurality of different encrypted keywords corresponding to the keyword, and determining the keyword is found if the plurality of different trapdoors match with one the encrypted keyword corresponding to the keyword, otherwise determining the keyword is not found.

27 Claims, 4 Drawing Sheets

(51) Int. Cl.
  *H04L 29/06* (2006.01)
  *H04L 29/08* (2006.01)
(52) U.S. Cl.
  CPC ...... *H04L 63/0428* (2013.01); *H04L 63/1441* (2013.01); *H04L 67/1097* (2013.01); *G06F 2221/2107* (2013.01)

(56) References Cited

U.S. PATENT DOCUMENTS

| | | | |
|---|---|---|---|
| 8,130,964 B2* | 3/2012 | Boneh et al. | 380/278 |
| 8,213,609 B2 | 7/2012 | Kusakawa et al. | |
| 8,229,112 B2 | 7/2012 | Fuhr et al. | |
| 8,380,720 B2 | 2/2013 | Chang et al. | |
| 8,615,668 B2* | 12/2013 | Matsuda et al. | 713/189 |
| 8,812,867 B2* | 8/2014 | Jho et al. | 713/189 |
| 9,535,658 B2* | 1/2017 | Kolesnikov | G06F 7/24 |
| 2011/0145594 A1 | 6/2011 | Jho et al. | |
| 2013/0046974 A1 | 2/2013 | Kamara et al. | |
| 2014/0075202 A1 | 3/2014 | Varadharajan et al. | |
| 2015/0229611 A1 | 8/2015 | Kaushik et al. | |

OTHER PUBLICATIONS

Cathalo et al., "One-Time Trapdoor One-Way Functions," Université catholique de Louvain, Place de Levant 3, 1348 Louvain-laNeuve, Belgium, http://perso.uclovain.be/christophe.petit/files/ISC2010short.pdf, visited Feb. 24, 2012, 15 pages.

Chen et al., "Efficient generic on-line/off-line signatures without key exposure," Applied Cryptography and Network Security, Proceedings 5th International Conference, ACNS 2007, 2007, 6 pages.

Xu et al., "Secure Cloud Storage with Encrypted Data using File Based Authentication," International Association for Cryptologic Research, http://eprint.iacr.org/2011/538.pdf, visited Feb. 24, 2012, 13 pages.

Asija et al. "Data Model to Enhance the Security and Privacy of Healthcare Data," *2014 IEEE Global Humanitarian Technology Conference—South Asia Satellite (GHTC-SAS)*, pp. 237-244, Sep. 26-27, 2014, 8 pages.

Boneh et al. "Identity-Based Encryption from the Weil Pairing," *SIAM J. of Computing*, vol. 32, No. 3, pp. 586-615, 2003, 31 pages.

Boneh et al., "Public key encryption with keyword search," Cachin, C., Camenisch, J.L. (eds.), *EUROCRYPT 2004*, LNCS, vol. 3027, pp. 506-522. Springer-Verlag, 2004, 15 pages.

Hwang, et al., "Public Key Encryption with Conjunctive Keyword Search and Its Extension to a Multi-User System," *Conference: Pairing-Based Cryptography*, Tokyo, Japan, pp. 2-22, Springer-Verlag, 2007, 21 pages.

Kaushik et al. "Multi-user Attribute Based Searchable Encryption," *2013 IEEE 14th International Conference on Mobile Data Management*, pp. 200-205, 2013, 6 pages.

Mukherjee et al. "A Context Based Cryptographic Content Sharing System," *2013 International Conference on Advances in Computing, Communications and Informatics (ICACCI)*, pp. 477-482, 2013, 6 pages.

Nallusamy et al. "Securing Wireless Sensor Network Based Solutions," *2012 World Congress on Information and Communication Technologies*, pp. 583-589, 2012, 7 pages.

Nallusamy et al. "Strong Authentication for Secure Content Access in Converged Networks," *2009 IEEE 3rd International Symposium on Advanced Networks and Telecommunication Systems (ANTS)*, New Delhi, Dec. 2009, 3 pages.

Park et al., "Public Key Encryption with Conjunctive Field Keyword Search," *Proceedings of WISA '04*, LNCS vol. 3325, pp. 73-86, Springer-Verlag, 2004, 14 pages.

Varadharajan et al. "Anonymous Searchable Encryption Scheme for Multi-User Databases," *2013 IEEE International Conference on Cloud Engineering*, pp. 225-232, 2013, 8 pages.

Vashistha et al. "Watermarking Video Content Using Visual Cryptography and Scene Averaged Image," *2010 IEEE International Conference on Multimedia and Expo (ICME)*, pp. 1641-1646, Jul. 2010, 6 pages.

Galbraith et al., "Pairings for cryptographers," *Discrete Applied Mathematics*, 2008, pp. 3113-3121, vol. 156, No. 16, 9 pages.

Koblitz and Menezes, "Pairing-Based Cryptography at High Security Levels," In: Smart N.P. (eds) *Cryptography and Coding. Cryptography and Coding 2005, Lecture Notes in Computer Science*, 2005, vol. 3796, Springer, Berlin, Heidelberg, 25 pages.

Golle et al., "Secure Conjunctive Keyword Search Over Encrypted Data," in "Applied Cryptography and Network Security," Second International Conference, ACNS 2004, Yellow Mountain, China, Jun. 8-11, 2004, Proceedings, pp. 31-45.

\* cited by examiner

SEARCHING OVER ENCRYPTED KEYWORDS IN A DATABASE

CROSS REFERENCE TO RELATED APPLICATIONS

This application claims the benefit of India Application No. 4463/CHE/2012, filed Oct. 26, 2012, which is hereby incorporated by reference herein in its entirety.

FIELD

The field relates to searchable encryption. In particular, the present invention provides a computer-implemented method, system and computer readable medium for searching over encrypted keywords in a database.

BACKGROUND

The advent of storage as a service offered by cloud providers and facilitating efficient analytics over storage as a service, has opened an entire new area of research over methods for secure data storage and efficient search and retrieval. Numerous works have been done over secure data storage and efficient search and retrieval, with Boneh et al's method for trapdoor generation and corresponding search pioneering in the area. Boneh's method was based on double hashing of the keyword for trapdoor generation. Park et al's scheme improvised the trapdoor generation by providing a generation mechanism comprising usage of a single hash function over the keyword. But all these schemes suffer from offline key word guessing attacks. The trapdoors are generated statically, i.e., the same trapdoor is generated every time for a particular key word, making it vulnerable to brute force attack over the limited range of dictionary words by a misfeasor, masquerader or clandestine user.

Work for architectural design framework was proposed in the cryptographic cloud storage scheme. In the existing schemes, to search for any keyword, the data user supplies the keyword to the data managing authority to get a corresponding trapdoor which is searched at the cloud database. Since keywords form a very limited range of dictionary words, the present schemes are liable to an offline keyword guessing attack, i.e. the user can sniff a trapdoor from the network and then by applying a brute force attack over it, they can guess the corresponding keyword.

The existing processes have limitations such as searchable encryption that uses the same trapdoor (unique static), for the same keyword to be searched for, i.e. there is a one to one mapping between the keyword and trapdoor. The existing methods are vulnerable to online and offline dictionary attacks. All existing schemes are based on single trapdoor search.

Thus, there is a need to overcome the problems of the existing technologies.

SUMMARY

According to one aspect of the invention there is provided a computer implemented method executed by one or more computing devices for providing searching over encrypted keywords in a database. The method comprises the steps of generating at least one keyword, generating a plurality of different encrypted keywords corresponding to said keyword, storing said at least one encrypted keyword in said database, generating a plurality of different trapdoors for said keyword, verifying said plurality of different trapdoors with said plurality of different encrypted keywords corresponding to said keyword, and determining said keyword is found if at least one of the said plurality of different trapdoors matches with one of the said plurality of different encrypted keywords corresponding to said keyword, otherwise determining said keyword is not found.

According to another aspect of the invention there is provided a system for providing searching over encrypted keywords in a database. The system comprises a memory and a processor operatively coupled to the memory. The processor configured to perform the steps of generating at least one keyword, generating a plurality of different encrypted keywords corresponding to said keyword, storing said at least one encrypted keyword in said database, generating a plurality of different trapdoors for said keyword, verifying said plurality of different trapdoors with said plurality of different encrypted keywords corresponding to said keyword, and determining said keyword is found if at least one of the said plurality of different trapdoors matches with one of the said plurality of different encrypted keywords corresponding to said keyword, otherwise determining said keyword is not found.

According to another aspect of the invention there is provided a computer-readable code stored on a non-transitory computer-readable medium that, when executed by a computing device, performs a method for providing searching over encrypted keywords in a database. The method comprises the steps of generating at least one keyword, generating a plurality of different encrypted keywords corresponding to said keyword, storing said at least one encrypted keyword in said database, generating a plurality of different trapdoors for said keyword, verifying said plurality of different trapdoors with said plurality of different encrypted keywords corresponding to said keyword, and determining said keyword is found if at least one of said plurality of different trapdoors matches with one of the said plurality of different encrypted keywords corresponding to said keyword, otherwise determining said keyword is not found.

BRIEF DESCRIPTION OF THE DRAWINGS

Features, aspects, and advantages of the present invention will be better understood when the following detailed description is read with reference to the accompanying drawings in which like characters represent like parts throughout the drawings, wherein.

DETAILED DESCRIPTION

Figure 1:
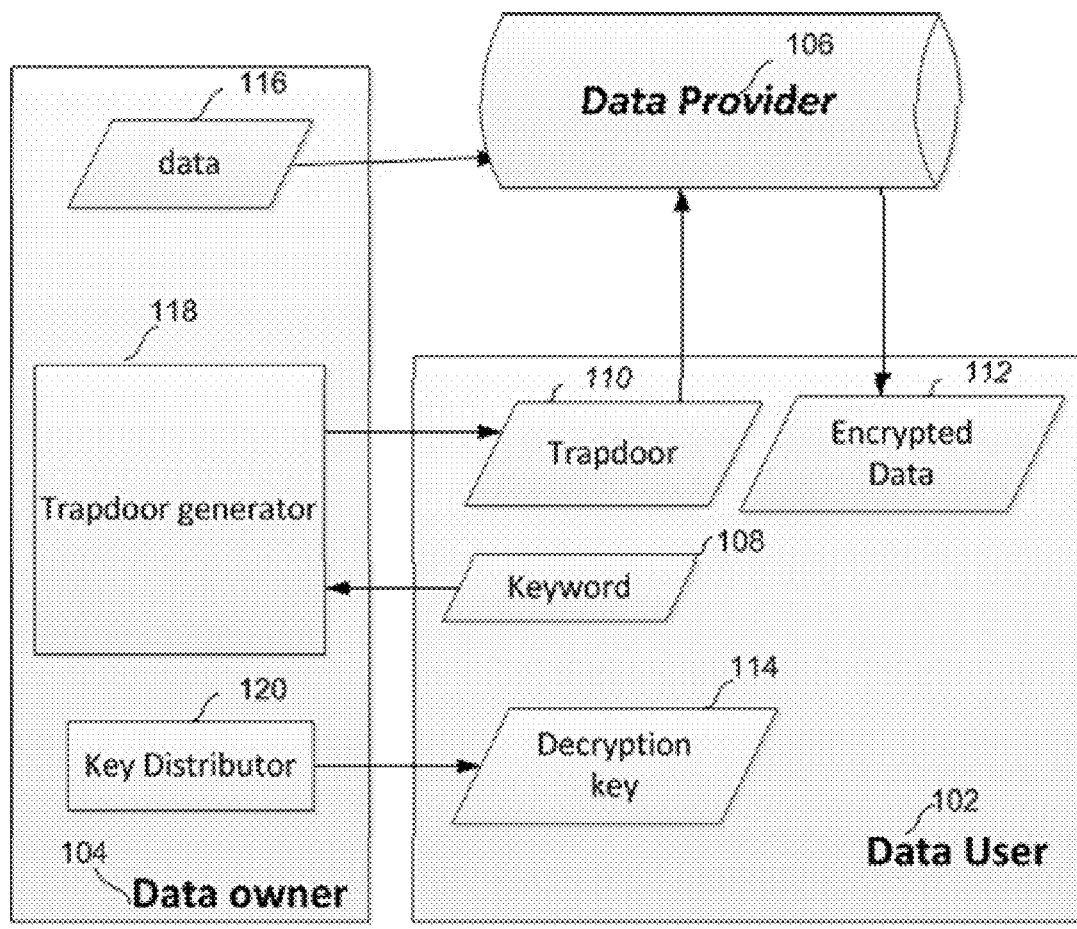
FIG. 1 shows a three-tier architecture for a data outsourcing model.

The present inventors have developed a computer-implemented method, system and computer-readable medium for providing searching over encrypted keywords in a database, which can provide secure search by generating one time trapdoors, i.e., a trapdoor is changed dynamically every time for the same keyword.

While systems and methods are described herein by way of example and embodiments, those skilled in the art recognize that systems and methods for providing searching over encrypted keywords in a database are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

As a preliminary matter, the definition of the term "or" for the purpose of the following discussion and the appended claims is intended to be an inclusive "or" That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "A" or "B" includes: "A" by itself, "B" by itself and any combination thereof, such as "AB" and/or "BA." It is worth noting that the present discussion relates to exemplary embodiments, and the appended claims should not be limited to the embodiments discussed herein.

FIG. 1 shows a three-tier architecture for a data outsourcing model. Data storage on the cloud is neither a single user task nor a onetime involvement. It involves multiple users and a number of times that data is to be stored, used and modified. Interfaces for inter user interactions are also essential to provide an efficient architecture. The architecture used for demonstration of the concept involves three parties, and hence is termed as three-tier architecture. The different components are a Data User (102), a Data Owner (104) and a Data Provider (106).

The Data User

The data user (102) consists of an individual(s) or the corporation accessing the data. Considering the healthcare scenario, the user list consists of Patient, Doctor, Hospital, Pharmaceutical Company, Diagnostic Labs, Research Scientists, Health Ministry, Blood Bank and related organizations. The data user communicates with the Data Owner and the Data provider as required.

The data user (102) provides a keyword W (108) that he wants to search for to the data owner (104). The data user (102) receives back the trapdoor $T_W$ (110) and using it, the data user looks into the data provider (106) for a particular keyword and the search results are returned in encrypted form (112). The data user may then request the decryption key (114), or use an encryption key already in possession, for decrypting the selected files.

Data Owner

The data owner (104) is the enterprise which owns the data and has outsourced it to the data provider (106). The data provider (106) can be a cloud provider, database provider, etc. The data owner (104) has the function to encrypt the data, outsource it for storage, provide a trapdoor for searching options and distribute appropriate keys for decryption of data to authorized users only. The three essential components of the data owner system are the data (116), the trapdoor generator (118) and the key distributor (120). The data component stores the encrypted data at the provider. The trapdoor generator (118) receives the keyword to be searched for from the data user and generates the corresponding trapdoor for the user. The key distributor component (120) as the name depicts performs the task of maintaining the public parameters, maintaining decryption keys and distributing them to the users when asked. The data verifier component (not shown in figure), if included, checks the integrity of the data. It checks if the data stored at the provider has been modified by anyone unauthorized to do so. It is implemented by storing an additional tag with the data files which is changed on every change in the file, and hence keeps track of the integrity of the data. The tag can be a checksum which is intact for a given file. The detailed description of integrity verification has been omitted here. The major focus here is on the trapdoor generation and searching in the three tier architecture.

Data Provider

The data provider (106) stores the data. It performs the function of storing the data provided by the data owner (104). It also enables data search by the user by comparing the trapdoor with the data field and returns the results in an encrypted format.

Figure 2:
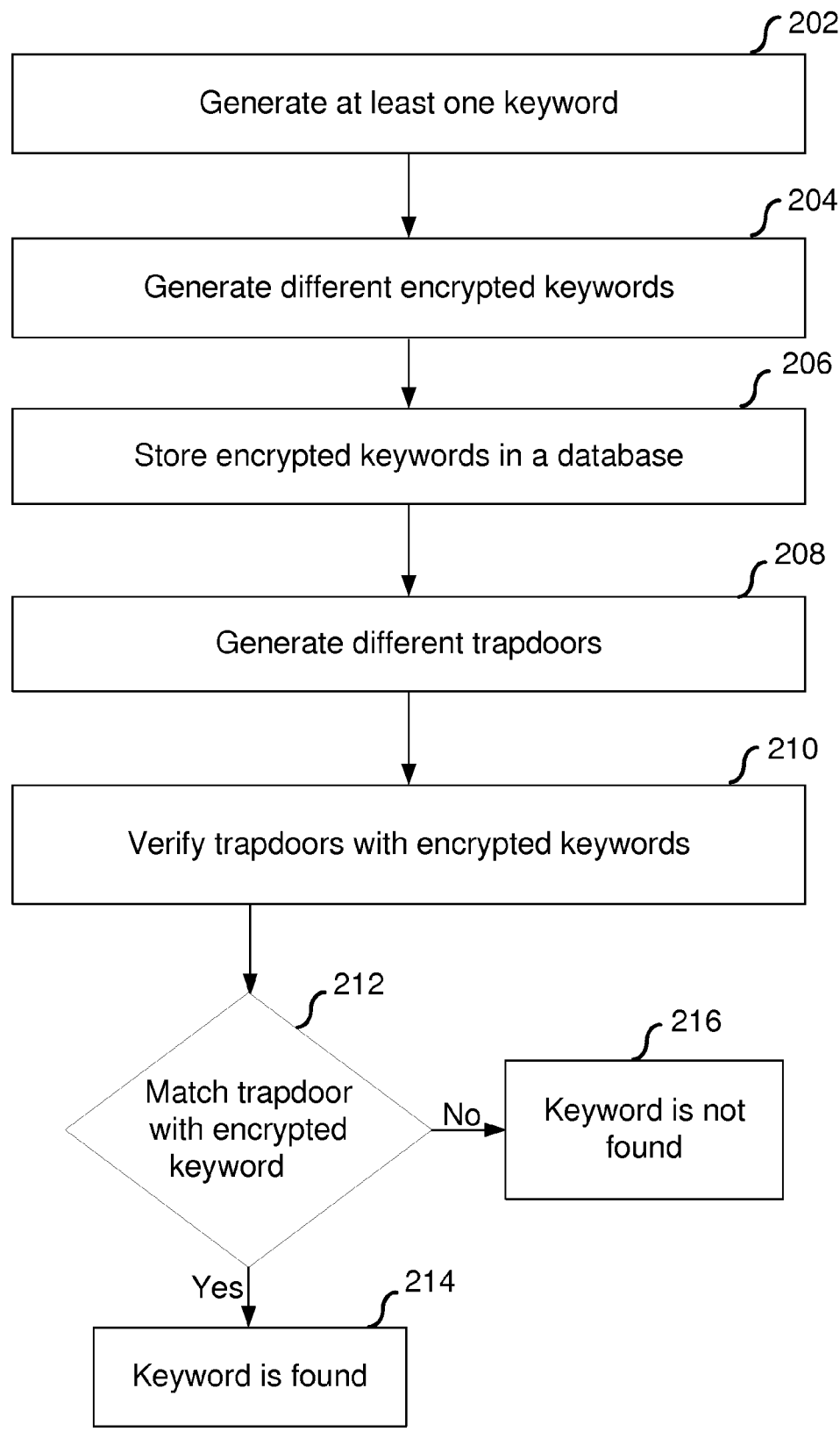
FIG. 2 shows a flowchart depicting a method for providing searching over encrypted keywords in a database.

FIG. 2 shows a flowchart depicting a method for providing searching over encrypted keywords in a database. The method comprises the steps to generate one or more keywords (202) for the searchable data. After preparing keywords, a plurality of different encrypted keywords (204) corresponding to the keyword are generated. Then, the encrypted keywords are stored in the database (206). The present invention provides one time trapdoor generation, i.e. a plurality of different trapdoors (208) are generated for the keyword of searchable data. Then, the plurality of different trapdoors are verified (210) with the plurality of different encrypted keywords corresponding to the keyword. If at least one of the plurality of different trapdoors match (212) with one of the said plurality of different encrypted keywords corresponding to the keyword then it is determined that the keyword is found (214); otherwise, it is determined that the keyword is not found (216) in the database.

Figure 3:
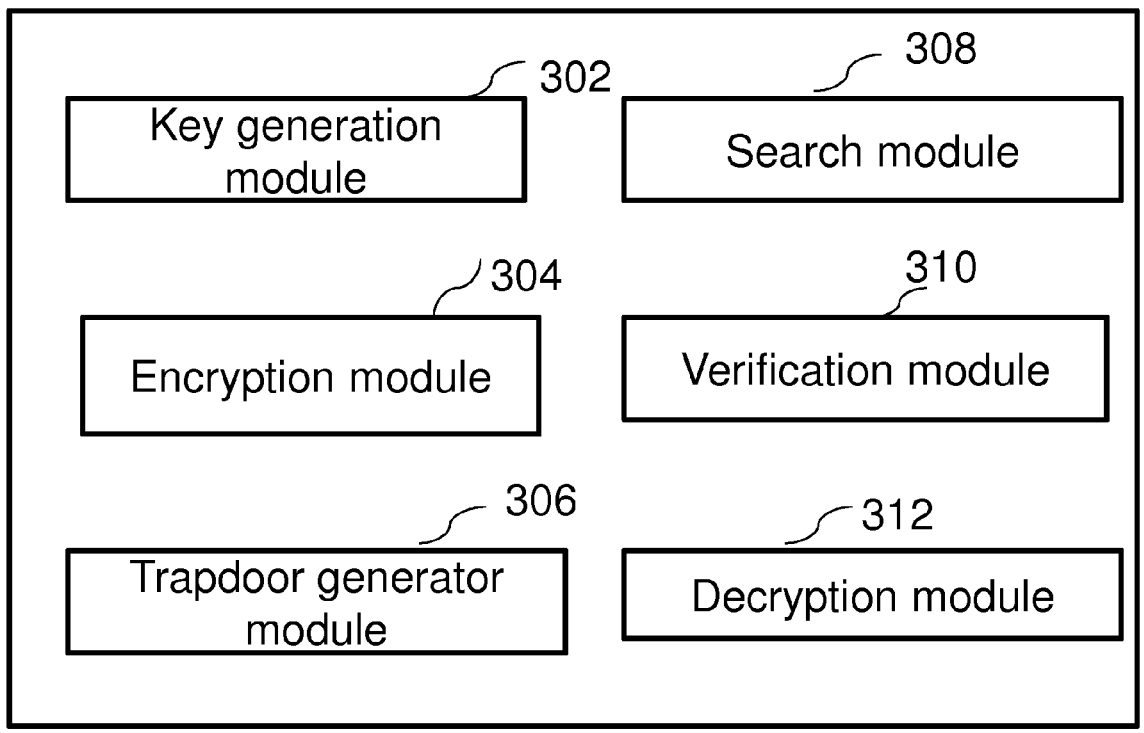
FIG. 3 shows an environment in which the present invention can be practiced, in accordance with an embodiment of the present invention.

FIG. 3 shows an environment in which the present invention can be practiced, in accordance with an embodiment of the present invention. The system (300) comprises a key generation module (302), an encryption module (304), a trapdoor generator module (306), a search module (308), a verification module (310) and a decryption module (312).

The key generation module (302) performs a key generation process and provides the required keys for encryption and decryption.

Key Generation

Based on a security parameter k, system parameters and keys are generated. G1 and G2 are two cyclic groups of some prime order n with an admissible bilinear map ê: $G_1 \times G_1 \to G_2$, wherein G1 is an additive cyclic group and G2 is a multiplicative cyclic group.

A generator $P_0$ for $G_1$ is generated. Three cryptographic hash functions $H_1$, $H_2$ and $H_3$ are selected where $H_1:\{0,1\}^* \to \{0,1\}^*$ and $H_2:G_2 \to \{0,1\}^*$ and $H_3:\{0,1\}^* \to G_1$.

Consider the message as M and cipher text as C. Randomly $s_t$ is selected as the secret key, where $s_t \in Z/qZ$.

$$P_{ID} = H_3(ID) \quad (1)$$

Where $P_{ID}$ is the encryption key and ID is the user identity used for identity based encryption. Also the decryption key is $K_d$ where $$K_d = P_{ID} \cdot s_t \quad (2)$$

The Public key is $Q_t$ and is defined as $$Q_t = s_t P_0. \quad (3)$$

The encryption module (304) performs the operation of the encryption of the data and keywords, i.e. generates a plurality of different encrypted keywords corresponding to the keyword.

Encryption

For encryption, randomly select r such that $r \in Z/qZ$. The message is M, keyword is W and the cipher text is C.

$$C \text{ is defined as } C = [V, J, N] \quad (4)$$

$$\text{Where, } V = M \oplus H_2(ê(P_{ID}, Q_t)^r) \quad (5)$$

$$J = rH_1(W)P_0 + rQ_t \text{ and } N = r \cdot P_0 \quad (6)$$

The message M is stored in the above form C at the data provider. V is the encryption of the message M, using identity based encryption. The J and N components of C are useful for keyword search.

The trapdoor generator module (306) performs the operation of trapdoor generation, i.e. generates a plurality of different trapdoors (208) for the keyword.

Trapdoor Generation

The most important component for the architecture is the generation of a trapdoor and its security. For any keyword 'W' the user wants to search for, a trapdoor $T_W$ is generated. The architecture uses the approach of a one time trapdoor, so even for the same keyword, a new trapdoor is generated every time. So the possibility of online keyword guessing attack is eliminated. The trapdoor generation method also introduces a random parameter 'y' and using 'y' it generates a one time trapdoor, and breaking it is a discrete logarithmic problem, thus eliminating any possibility for offline keyword guessing attack. This random parameter generated leads to a new trapdoor every time, since for each search a new random parameter is generated.

For any keyword 'W' the user wants to search for, it sends 'W' to the data owner (104). The trapdoor $T_W$ is generated by the data owner (104) and sent back to the data user (102). For keyword 'W' Trapdoor $T_W$ is defined as $$T_W = [y \cdot (H_1(W) + s_t)^{-1} P_0, y \cdot P_0] \quad (7)$$

Where y is a random parameter, selected such that $y \in Z/qZ$.

For simplicity of expression the trapdoor may be written as $$T_W = [L, K] \quad (8)$$

The search module (308) performs the operation of search in the database.

Search

The architecture provides for searchable encryption using a one time trapdoor. To search for a keyword W, the user sends the word to the data owner (104), and receives back the trapdoor $T_W$. The system then sends the trapdoor to the data provider (106), and a search is performed at the data provider (106). All the files which match the search are given, but in encrypted form only. The user can decrypt the files using the decryption key which it has or can get from the data owner. The mechanism for search is explained.

The trapdoor is sent to the data provider is $T_W$ where, $$T_W = [L, K].$$

The provider checks if $$ê(N, K) = ê(J, L) \quad (9)$$

If the expression evaluates to true, then the keyword matches and the file is returned; otherwise, the keyword does not match, and the file is not returned.

The verification module (310) performs the operation of verification of the plurality of different trapdoors with the plurality of different encrypted keywords corresponding to the keyword.

Verification

The search approach mentioned is consistent. The requirement is that for any keyword W and trapdoor $T_W$, if the search evaluates to true, then the concerned keyword is the one which is being searched for.

The consistency of the search using trapdoor is checked as: ê(J,L)

Substituting the values for J and L $$= ê(rH_1(W)P_0 + rQ_t, y(H_1(W) + s_t)^{-1} \cdot P_0)$$

It is known that $Q_t = s_t \cdot P_0$. Using it, $$= ê(rH_1(W)P_0 + rs_t \cdot P_0, y(H_1(W) + s_t)^{-1} \cdot P_0)$$

$$= ê(r(H_1(W) + s_t) \cdot P_0, y(H_1(W) + s_t)^{-1} \cdot P_0)$$

$$= ê(r \cdot P_0, y \cdot P_0)^{(H_1(W) + s_t) \cdot (H_1(W) + s_t)^{-1}}$$

$$= ê(r \cdot P_0, y \cdot P_0)$$

$$= ê(N, K)$$

Based on the process, it is observed that the mechanism works for the keyword search using a one time trapdoor.

The decryption module (312) performs the operation of the decryption of the keyword.

Decryption

On completion of search, the user requests for the required documents. The user gets the decryption key $K_d$ from the data owner or uses the one the user already has. Using the cipher text and the decryption key the user can get the data M as $$M = V \oplus H_2(ê(K_d, N)) \quad (10)$$

The present invention provides a secure storage and retrieval of data in a database, particularly on the cloud using a one time trapdoor scheme. Though the scheme has been developed over the three tier architecture model, it is equally applicable over other models of data storage. With the one-time trapdoor scheme, a new trapdoor is generated every time for the same keyword using a random seed. Also the possibility of offline and online keyword guessing attack can be overruled. Thus the architectural model proposed is an efficient and secure method for searchable encryption over the cloud.

Exemplary Computing Environment

Figure 4:
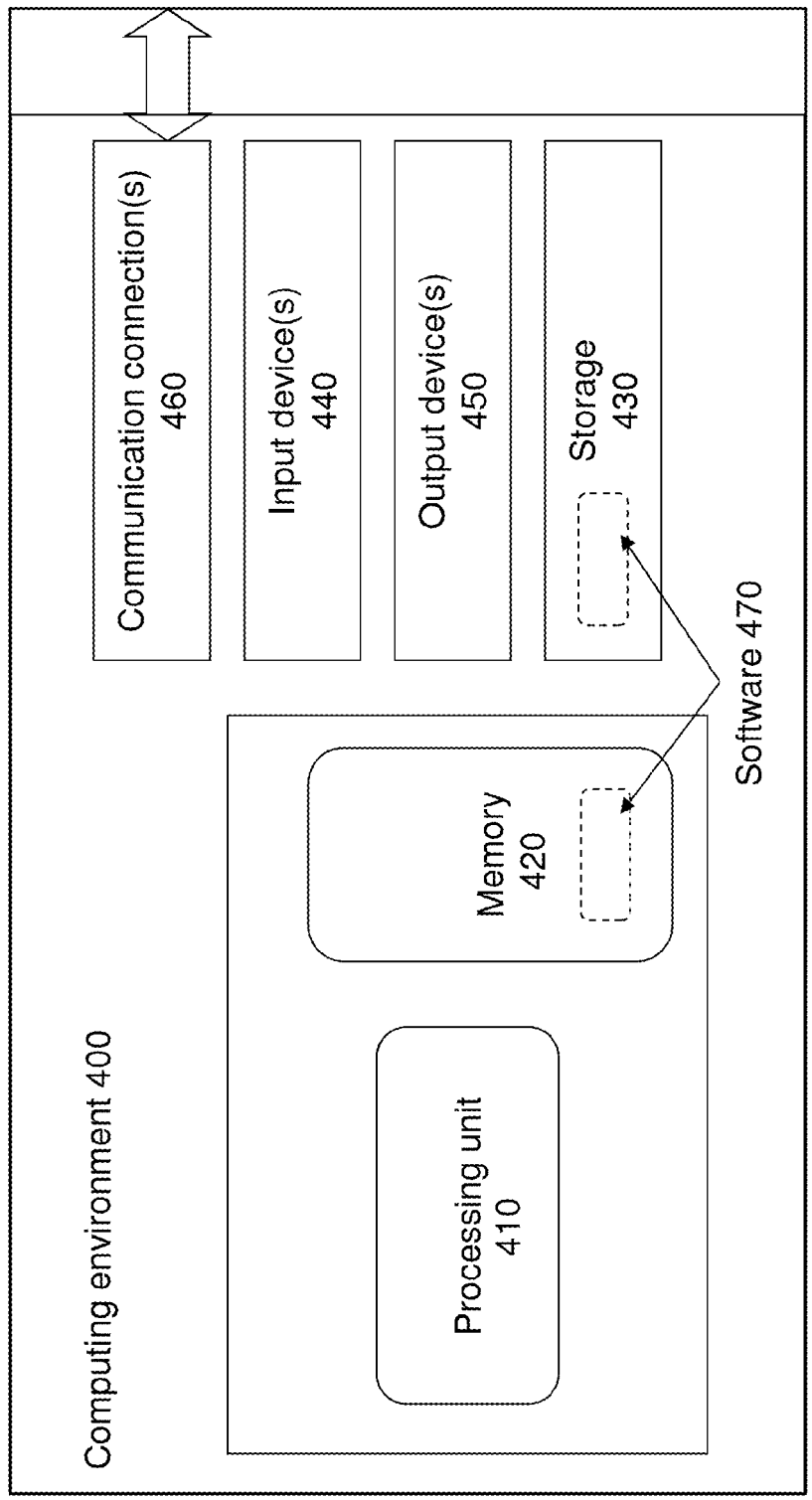
FIG. 4 shows a generalized computer network arrangement, in one embodiment of the present technique.

One or more of the above-described techniques may be implemented in or involve one or more computer systems. FIG. 4 shows a generalized example of a computing environment 400. The computing environment 400 is not intended to suggest any limitation as to scope of use or functionality of described embodiments.

With reference to FIG. 4, the computing environment 400 includes at least one processing unit 410 and memory 420. The processing unit 410 executes computer-executable instructions and may be a real or a virtual processor. In a multi-processing system, multiple processing units execute computer-executable instructions to increase processing power. The memory 420 may be volatile memory (e.g., registers, cache, RAM), non-volatile memory (e.g., ROM, EEPROM, flash memory, etc.), or some combination of the two. In some embodiments, the memory 420 stores software 470 implementing the described techniques.

A computing environment may have additional features. For example, the computing environment 400 includes storage 430, one or more input devices 440, one or more output devices 450, and one or more communication connections 460. An interconnection mechanism (not shown) such as a bus, controller, or network interconnects the components of the computing environment 400. Typically, operating system software (not shown) provides an operating environment for other software executing in the computing environment 400, and coordinates activities of the components of the computing environment 400.

The storage 430 may be removable or non-removable, and includes magnetic disks, magnetic tapes or cassettes, CD-ROMs, CD-RWs, DVDs, or any other medium which may be used to store information and which may be accessed within the computing environment 400. In some embodiments, the storage 430 stores instructions for the software 470.

The input device(s) 440 may be a touch input device such as a keyboard, mouse, pen, trackball, touch screen, or game controller, a voice input device, a scanning device, a digital camera, or another device that provides input to the computing environment 400. The output device(s) 450 may be a display, printer, speaker, or another device that provides output from the computing environment 400.

The communication connection(s) 460 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 400, computer-readable media include memory 420, storage 430, communication media, and combinations of any of the above.

Having described and illustrated the principles of our invention with reference to described embodiments, it will be recognized that the described embodiments may be modified in arrangement and detail without departing from such principles.

In view of the many possible embodiments to which the principles of our invention may be applied, we claim as our invention all such embodiments as may come within the scope and spirit of the claims and equivalents thereto.

While the present invention has been related in terms of the foregoing embodiments, those skilled in the art will recognize that the invention is not limited to the embodiments depicted. The present invention may be practiced with modification and alteration within the spirit and scope of the appended claims. Thus, the description is to be regarded as illustrative instead of restrictive on the present invention.

As will be appreciated by those of ordinary skill in the art, the foregoing example, demonstrations, and method steps may be implemented by suitable code on a processor-based system, such as general purpose or special purpose computers. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skill in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The detailed description is presented to enable a person of ordinary skill in the art to make and use the invention and is provided in the context of the requirement for a obtaining a patent. The present description includes the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

We claim:

1. A computer implemented method executed by one or more computing devices for searching encrypted keywords in a database, the method comprising:
    generating a keyword;
    based on the generated keyword, creating, at a data owner computing device, two or more different encrypted keywords corresponding to the generated keyword;
    storing the two or more different encrypted keywords for the generated keyword in the database, wherein the database is stored on a data provider computing device and storing the two or more different encrypted keywords comprises sending the two or more different encrypted keywords from the data owner computing device to the data provider computing device;
    generating, by the data owner computing device, a first trapdoor that matches at least one of the two or more different encrypted keywords stored in the database;
    generating, by the data owner computing device, a second trapdoor, different from the first trapdoor, that matches at least one of the two or more different encrypted keywords stored in the database;

receiving, at the data owner computing device, a first request for a trapdoor for the generated keyword from a data user computing device;

responsive to the first request, sending the first trapdoor from the data owner computing device to the data user computing device for use in searching of the encrypted keywords in the database, wherein the first trapdoor causes a keyword-is-found result when the first trapdoor is compared to the two or more encrypted keywords for the generated keyword in the database stored on the data provider computing device;

receiving, at the data owner computing device, a second request for a trapdoor for the generated keyword from the data user computing device; and responsive to the second request, sending the second trapdoor from the data owner computing device to the data user computing device for use in searching the encrypted keywords in the database, wherein the second trapdoor causes a keyword-is-found result when the second trapdoor is compared to the two or more encrypted keywords for the generated keyword in the database stored on the data provider computing device.

2. The method as claimed in claim 1, wherein said creating the two or more encrypted keywords comprises using an encryption module.

3. The method as claimed in claim 1, wherein said creating the two or more encrypted keywords comprises:
using a function $J=rH_1(W)P_0+rQ_t$ and $N=r \cdot P_0$, where r is a random number, $H_1$ is a hash function, W is the generated keyword, $P_0$ is a generator of a group G1, and $Q_t$ is a public key.

4. The method as claimed in claim 3, wherein said group G1 is a cyclic group of a predefined order (n).

5. The method as claimed in claim 3, wherein said public key $Q_t=s_t P_0$, where $s_t$ is a secret key.

6. The method as claimed in claim 1, wherein generating the first and second trapdoors comprises using a trapdoor generator module.

7. The method as claimed in claim 1, wherein generating the first and second trapdoors comprises using a function $T_W=[L,K]$, where L is $y \cdot (H_1(W)+s_t)^{-1} P_0$, K is $y \cdot P_0$, where y is a random number, $H_1$ is a hash function, W is the generated keyword, $s_t$ is a secret key, and $P_0$ is a generator of a group G1.

8. The method as claimed in claim 1, further comprising:
verifying the first and second trapdoors with the two or more different encrypted keywords based on the generated keyword.

9. The method as claimed in claim 1, further comprising:
verifying the first and second trapdoors using a function $\hat{e}(N,K)=\hat{e}(J,L)$, where $N=r \cdot P_0$, $K=y \cdot P_0$, $J=rH_1(W)P_0+rQ_t$, $L=y \cdot (H_1(W)+s_t)^{-1} P_0$, where $\hat{e}$ is defined as $G_1 \times G_1 \to G_2$, G1 is an additive cyclic group, G2 is a multiplicative cyclic group, r is a random number, $H_1$ is a hash function, W is the generated keyword, $P_0$ is a generator of the group G1, $Q_t$ is a public key, $s_t$ is a secret key, and y is a random number.

10. A system for searching encrypted keywords, the system comprising:
a memory;
a database stored, at least in part, in the memory; and
one or more processors, at least one of which is operatively coupled to the memory, the one or more processors configured to perform the steps of:
generating a keyword;
creating, at a data owner computing device, a plurality of different encrypted keywords corresponding to said generated keyword;

storing said plurality of different encrypted keywords in said database using a data provider computing device, wherein the database is stored in the data provider computing device and storing the plurality of different encrypted keywords comprises sending the plurality of different encrypted keywords from the data owner computing device to the data provider computing device;

generating, by the data owner computing device, a first trapdoor that matches at least one of the plurality of different encrypted keywords stored in the database;

generating, by the data owner computing device, a second trapdoor, different from the first trapdoor, that matches at least one of the plurality of different encrypted keywords stored in the database;

receiving, at the data owner computing device, a first request for a trapdoor for the generated keyword from a data user computing device;

responsive to the first request, sending the first trapdoor from the data owner computing device to the data user computing device for use in searching the encrypted keywords in the database using the data provider computing device, wherein the first trapdoor causes a keyword-is-found result when the first trapdoor is compared to the plurality of different encrypted keywords for the generated keyword in the database stored on the data provider computing device;

receiving, at the data owner computing device, a second request for a trapdoor for the generated keyword from the data user computing device; and responsive to the second request, sending the second trapdoor from the data owner computing device to the data user computing device for use in searching the encrypted keywords in the database using the data provider computing device wherein the second trapdoor causes a keyword-is-found result when the second trapdoor is compared to the plurality of different encrypted keywords for the generated keyword in the database stored on the data provider computing device.

11. The system of claim 10, wherein said creating said plurality of different encrypted keywords comprises using an encryption module.

12. The system of claim 10, wherein said creating said plurality of different encrypted keywords comprises using a function $J=rH_1(W)P_0+rQ_t$ and $N=r \cdot P_0$, where r is a random number, $H_1$ is a hash function, W is the generated keyword, $P_0$ is a generator of a group G1, and $Q_t$ is a public key.

13. The system of claim 12, wherein said group G1 is a cyclic group of a predefined order (n).

14. The system of claim 12, wherein said public key $Q_t=s_t P_0$, where $s_t$ is a secret key.

15. The system of claim 10, wherein generating the first and second trapdoors comprises using a trapdoor generator module.

16. The system of claim 10, wherein generating the first and second trapdoors comprises using a function $T_W=[L,K]$, where L is $y \cdot (H_1(W)+s_t)^{-1} P_0$, K is $y \cdot P_0$, where y is a random number, $H_1$ is a hash function, W is the generated keyword, $s_t$ is a secret key, and $P_0$ is a generator of a group G1.

17. The system of claim 10, wherein the steps further comprise:
verifying the first and second trapdoors with the plurality of different encrypted keywords based on the generated keyword.

18. The system of claim 10, wherein the steps further comprise:

verifying the first and second trapdoors using a function $\hat{e}(N,K)=\hat{e}(J,L)$, where $N=r \cdot P_0$, $K=y \cdot P_0$, $J=rH_1(W)P_0+rQ_t$, $L=y \cdot (H_1(W)+s_t)^{-1}P_0$, where $\hat{e}$ is defined as $G_1 \times G_1 \rightarrow G_2$, G1 is an additive cyclic group, G2 is a multiplicative cyclic group, r is a random number, $H_1$ is a hash function, W is the generated keyword, $P_0$ is a generator of the group G1, $Q_t$ is a public key, $s_t$ is a secret key, and y is a random number.

19. A non-transitory computer-readable medium comprising computer-executable instructions that, when executed by a computing device, perform a method for searching encrypted records in a database, the method comprising:

generating a keyword associated with a record stored in the database in an encrypted format, wherein the database is stored on a data provider computing device;

creating, at a data owner computing device, two or more different encrypted keywords corresponding to the generated keyword;

storing the two or more different encrypted keywords in the database and associating the two or more different encrypted keywords with the record, wherein storing the two or more different encrypted keywords comprises sending the two or more different encrypted keywords from the data owner computing device to the data provider computing device;

generating, by the data owner computing device, a first one-time trapdoor, based on the generated keyword and a random parameter, that matches at least one of the two or more different encrypted keywords stored in the database and associated with the record;

generating, by the data owner computing device, a second one-time trapdoor, different from the first trapdoor, based on the generated keyword and another random parameter, that also matches at least one of the two or more different encrypted keywords stored in the database and associated with the record;

receiving, at the data owner computing device, a first request from a data user computing device for a trapdoor for use in searching the encrypted records for the generated keyword;

sending the first one-time trapdoor from the data owner computing device to the data user computing device for use in searching the encrypted records in the database stored on the data provider computing device;

receiving, at the data owner computing device, a second request from the data user computing device for a one-time trapdoor for use in searching the encrypted records for the generated keyword; and sending the second one-time trapdoor from the data owner computing device to the data user computing device for use in searching the encrypted records in the database stored on the data provider computing device.

20. The computer-readable medium of claim 19, wherein said creating the two or more different encrypted keywords comprises using an encryption module.

21. The computer-readable medium of claim 19, wherein said creating the two or more different encrypted keywords comprises using a function $J=rH_1(W)P_0+rQ_t$ and $N=r \cdot P_0$, where r is a random number, $H_1$ is a hash function, W is the generated keyword, $P_0$ is a generator of a group G1, and $Q_t$ is a public key.

22. The computer-readable medium of claim 21, wherein said group G1 is a cyclic group of a predefined order (n).

23. The computer-readable medium of claim 21, wherein said public key $Q_t=s_tP_0$, where $s_t$ is a secret key.

24. The computer-readable medium of claim 19, wherein generating the first and second one-time trapdoors comprises using a trapdoor generator module.

25. The computer-readable medium of claim 19, wherein the first and second one-time trapdoors are generated using a function $T_W=[L,K]$, where L is $y \cdot (H_1(W)+s_t)^{-1}P_0$, K is $y \cdot P_0$, where y is a random number, $H_1$ is a hash function, W is the generated keyword, $s_t$ is a secret key, and $P_0$ is a generator of a group G1.

26. The computer-readable medium of claim 19, wherein the method further comprises:

verifying the first and second one-time trapdoors with the two or more different encrypted keywords.

27. The computer-readable medium of claim 19, wherein the method further comprises:

verifying the first and second one-time trapdoors using a function $\hat{e}(N,K)=\hat{e}(J,L)$, where $N=r \cdot P_0$, $K=y \cdot P_0$, $J=rH_1(W)P_0+rQ_t$, $L=y \cdot (H_1(W)+s_t)^{-1}P_0$, where $\hat{e}$ is defined as $G_1 \times G_1 \rightarrow G_2$, G1 is an additive cyclic group, G2 is a multiplicative cyclic group, r is a random number, $H_1$ is a hash function, W is the generated keyword, $P_0$ is a generator of the group G1, $Q_t$ is a public key, $s_t$ is a secret key, and y is a random number.

* * * * *